United States Patent
Uusitalo et al.

(10) Patent No.: US 10,820,238 B2
(45) Date of Patent: Oct. 27, 2020

(54) SYSTEM AND METHOD TO EXPLOIT OFFLOAD CAPABILITY IN A WIRELESS COMMUNICATIONS NETWORK

(75) Inventors: Mikko Uusitalo, Helsinki (FI); Mika P. Rinne, Espoo (FI)

(73) Assignee: Nokia Technologies Oy, Espoo (FI)

(*) Notice: Subject to any disclaimer, the term of this patent is extended or adjusted under 35 U.S.C. 154(b) by 458 days.

(21) Appl. No.: 14/005,937

(22) PCT Filed: Mar. 21, 2011

(86) PCT No.: PCT/IB2011/051178
§ 371 (c)(1),
(2), (4) Date: Sep. 18, 2013

(87) PCT Pub. No.: WO2012/127280
PCT Pub. Date: Sep. 27, 2012

(65) Prior Publication Data
US 2014/0003297 A1    Jan. 2, 2014

(51) Int. Cl.
*H04W 28/22*    (2009.01)
*H04W 28/02*    (2009.01)

(52) U.S. Cl.
CPC ....... *H04W 28/22* (2013.01); *H04W 28/0231* (2013.01)

(58) Field of Classification Search
CPC .......... H04B 1/44; H04B 1/56; H04B 7/0669; H04B 17/24; H04H 20/72; H04H 20/02; H04H 20/30; H04H 20/46; H04H 20/86; H04H 40/27; H04H 60/73; H04W 28/0231; H04W 28/22
USPC ....................................................... 370/259
See application file for complete search history.

(56) References Cited

U.S. PATENT DOCUMENTS

| | | | |
|---|---|---|---|
| 6,850,764 B1 | 2/2005 | Patel | |
| 7,469,141 B2 | 12/2008 | Macridis et al. | |
| 7,623,508 B2 | 11/2009 | Khoury et al. | |
| 7,639,612 B2 | 12/2009 | McEwen | |
| 8,085,731 B2 * | 12/2011 | Zhao | H04W 36/0044 370/331 |
| 8,599,778 B2 * | 12/2013 | Zisimopoulous | H04L 47/263 370/329 |

(Continued)

FOREIGN PATENT DOCUMENTS

| | | | | |
|---|---|---|---|---|
| EP | 2104275 A1 * | 9/2009 | | 370/259 |
| WO | 2010020637 A1 | 2/2010 | | |

OTHER PUBLICATIONS

International Search Report and Written Opinion Received in Corresponding Patent Cooperation Treaty Application PCT/IB2011/051178, dated Dec. 6, 2011. 12 pages.

(Continued)

*Primary Examiner* — Huy D Vu
*Assistant Examiner* — Nizam U Ahmed
(74) *Attorney, Agent, or Firm* — Harrington & Smith

(57) ABSTRACT

An apparatus includes at least one data processor and at least one memory storing computer program code. The at least one memory and computer program code are configured, with the at least one processor, to cause the apparatus at least to detect in a wireless communication network an excess capacity condition and to increase, from a currently subscribed-to value, to a higher value an aggregated higher bit rate for a mobile node operating in the wireless communication network.

14 Claims, 8 Drawing Sheets

(56) References Cited

U.S. PATENT DOCUMENTS

| | | | |
|---|---|---|---|
| 2002/0186710 A1* | 12/2002 | Alvesalo | H04W 16/14 370/468 |
| 2004/0057408 A1 | 3/2004 | Gray | |
| 2004/0215806 A1* | 10/2004 | Brenner et al. | 709/232 |
| 2005/0018697 A1 | 1/2005 | Enns et al. | |
| 2005/0207341 A1* | 9/2005 | Zhang | H04L 27/2608 370/232 |
| 2007/0121525 A1 | 5/2007 | Jenster | |
| 2009/0238207 A1* | 9/2009 | Zhao et al. | 370/468 |
| 2009/0239526 A1* | 9/2009 | Zhao | H04W 60/06 455/424 |
| 2009/0316656 A1* | 12/2009 | Zhao | H04W 28/22 370/331 |
| 2010/0214943 A1* | 8/2010 | Immendorf et al. | 370/252 |
| 2010/0240383 A1* | 9/2010 | Ankel | H04L 47/10 455/452.1 |
| 2011/0070906 A1* | 3/2011 | Chami et al. | 455/507 |
| 2011/0138066 A1* | 6/2011 | Kopplin | H04L 47/10 709/228 |
| 2011/0171953 A1* | 7/2011 | Faccin | H04W 48/08 455/426.1 |
| 2011/0317571 A1* | 12/2011 | Kokkinen | H04W 24/00 370/252 |
| 2012/0002643 A1* | 1/2012 | Chung | H04J 11/0093 370/331 |
| 2012/0077468 A1* | 3/2012 | Fan | G07C 9/00309 455/414.1 |
| 2012/0163199 A1* | 6/2012 | Marbach | H04W 28/02 370/252 |
| 2013/0188527 A1* | 7/2013 | Yang | H04W 28/22 370/259 |
| 2013/0344883 A1* | 12/2013 | Rinne | H04W 72/0453 455/452.1 |
| 2015/0230127 A1* | 8/2015 | Raleigh | H04L 47/2475 370/230 |

OTHER PUBLICATIONS

Saunalahti Group Oyj, "Annual Report 2004". Retrieved from: http://web.lib.hse.filFI/yrityspalvelin/pdf/2004/Esaunalahti2004.pdf; p. 7.

"Bandwidth On Demand", Tataphoton, Retrieved on Feb. 22, 2011, Webpage available at : http://www.tataphoton.com/tata-photon-bod.aspx.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", 3GPP TS 36.300, v8.11.0, Dec. 2009, pp. 1-148.

"3rd Generation Partnership Project; Technical Specification Group Services and System Aspects; General Packet Radio Service (GPRS) Enhancements for Evolved Universal Terrestrial Radio Access Network (E-UTRAN) Access (Release 10)", 3GPP TS 23.401, v10.0.0, Jun. 2010, pp. 1-261.

"3rd Generation Partnership Project; Technical Specification Group Radio Access Network; Feasibility Study for Further Advancements for E-UTRA (LTE-Advanced) (Release 9)", 3GPP TR 36.912, v9.3.0, Jun. 2010, pp. 1-61.

"3rd Generation Partnership Project; Technical Specification Group Services and System Aspects; General Packet Radio Service (GPRS); Service Description; Stage 2 (Release 10)", 3GPP TS 23.060, v10.0.0, Jun. 2010, pp. 1-303.

Das et al., "DHCPv4 and DHCPv6 Options for Access Network Discovery and Selection Function (ANDSF) Discovery", Internet Engineering Task Force, Request for Comments: 6153, Category: Standards Track, Feb. 2011, pp. 1-7.

Extended European Search Report received for corresponding European Patent Application No. 11861437.9, dated Jul. 31, 2014, 6 pages.

* cited by examiner

| | Newly Added Data Elements |
|---|---|
| AMBR EXCEPTION ALLOWED [ON/OFF] | X |
| AMBR RELAXATION [VALIDITY] | X |
| SECONDARY AMBR [PARAMS] | X |
| NOTE: THE FOLLOWING ENTRIES ARE REPEATED FOR EACH APN. | |
| APN IN USE — THE APN CURRENTLY USED, AS RECEIVED FROM THE S-GW. | |
| APN-AMBR — THE MAXIMUM AGGREGATED UPLINK AND DOWNLINK MBR VALUES TO BE SHARED ACROSS ALL NON-GBR BEARERS, WHICH ARE ESTABLISHED FOR THIS APN. | |
| FOR EACH PDN CONNECTION WITHIN THE APN: | |
| NOTE: THE FOLLOWING ENTRIES ARE REPEATED FOR EACH PDN CONNECTION WITHIN THE APN. | |
| IP ADDRESS(ES) — IPv4 ADDRESS AND/OR IPv6 PREFIX | |
| PDN TYPE — IPv4, IPv6, OR IPv4v6 | |
| S-GW ADDRESS IN USE (CONTROL PLANE) — THE IP ADDRESS OF THE S-GW CURRENTLY USED FOR SENDING CONTROL PLANE SIGNALLING. | X |
| S-GW TEID FOR S5/S8 (CONTROL PLANE) — S-GW TUNNEL ENDPOINT IDENTIFIER FOR THE S5/S8 INTERFACE FOR THE CONTROL PLANE. (FOR GTP-BASED S5/S8 ONLY). | X |
| S-GW ADDRESS IN USE (USER PLANE) — THE IP ADDRESS OF THE S-GW CURRENTLY USED FOR SENDING USER PLANE TRAFFIC. (FOR PMIP-BASED S5/S8 ONLY). | X |
| S-GW GRE KEY FOR DOWNLINK TRAFFIC (USER PLANE) — SERVING GW ASSIGNED GRE KEY FOR DOWNLINK TRAFFIC. THE USER PLANE FOR DOWNLINK TRAFFIC. (FOR PMIP-BASED S5/S8 ONLY) | X |
| P-GW IP ADDRESS FOR S5/S8 (CONTROL PLANE) — P-GW IP ADDRESS FOR THE S5/S8 FOR THE CONTROL PLANE SIGNALLING. | X |
| P-GW TEID FOR S5/S8 (CONTROL PLANE) — P-GW TUNNEL ENDPOINT IDENTIFIER FOR THE S5/S8 CONTROL PLANE INTERFACE. (FOR GTP-BASED S5/S8 ONLY). | X |
| P-GW ADDRESS IN USE (USER PLANE) — THE IP ADDRESS OF THE P-GW CURRENTLY USED FOR SENDING USER PLANE TRAFFIC. (FOR PMIP-BASED S5/S8 ONLY). | X |

FIG.6A

| FIG.6A |
|---|
| FIG.6B |

FIG.6

| | | |
|---|---|---|
| P-GW GRE KEY FOR UPLINK TRAFFIC (USER PLANE) | PDN GW ASSIGNED GRE KEY FOR THE S5/S8 INTERFACE FOR THE USER PLANE FOR UPLINK TRAFFIC. (FOR PMIP-BASED S5/S8 ONLY). | X |
| MS INFO CHANGE REPORTING SUPPORT INDICATION | THE MME AND/OR SGSN SERVING THE UE SUPPORT(S) PROCEDURES FOR REPORTING USER LOCATION INFORMATION AND/OR USER CSG INFORMATION CHANGES. | X |
| MS INFO CHANGE REPORTING ACTION | DENOTES WHETHER THE MME AND/OR THE SGSN IS/ARE REQUESTED TO SEND CHANGES IN USER LOCATION INFORMATION CHANGE FOR THIS BEARER. | X |
| CSG INFORMATION REPORTING ACTION | DENOTES WHETHER THE MME AND/OR THE SGSN IS/ARE REQUESTED TO SEND CHANGES IN USER CSG INFORMATION CHANGE FOR THIS BEARER. THIS FIELD DENOTES SEPARATELY WHETHER THE MME/SGSN ARE REQUESTED TO SEND CHANGES IN USER CSG INFORMATION FOR (a) CSG CELLS, (b) HYBRID CELLS IN WHICH THE SUBSCRIBER IS A CSG MEMBER, AND (c) HYBRID CELLS IN WHICH THE SUBSCRIBER IS NOT A CSG MEMBER, OR ANY COMBINATION OF THE ABOVE. | X |
| BCM | THE NEGOTIATED BEARER CONTROL MODE FOR GERAN/UTRAN. | X |
| DEFAULT BEARER | IDENTIFIES THE DEFAULT BEARER WITHIN THE PDN CONNECTION BY ITS EPS BEARER ID. THE DEFAULT BEARER IS THE ONE WHICH IS ESTABLISHED FIRST WITHIN THE PDN CONNECTION. (FOR GTP BASED S5/S8 OR FOR PMIP BASED S5/S8 IF MULTIPLE PDN CONNECTIONS TO THE SAME APN ARE SUPPORTED). | X |
| EPS PDN CHARGING CHARACTERISTICS | THE CHARGING CHARACTERISTICS OF THIS PDN CONNECTION e.g. NORMAL, PREPAID, FLAT-RATE AND/OR HOT BILLING. | X |

FIG.6B

SYSTEM AND METHOD TO EXPLOIT OFFLOAD CAPABILITY IN A WIRELESS COMMUNICATIONS NETWORK

RELATED APPLICATION

This application was originally filed as PCT Application No. PCT/IB2011/051178 filed Mar. 21, 2011.

TECHNICAL FIELD

The exemplary and non-limiting embodiments of this invention relate generally to wireless communication systems, methods, devices and computer programs and, more specifically, relate to cognitive connectivity, efficient use of spectrum, wireless broadband and user interfaces.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

AMBR aggregated maximum bit rate
ANDSF access network detection and selection function
EPS evolved packet system
GBR guaranteed bit rate
HSS home subscriber server
MBR maximum bit rate, an EPS bearer parameter
MME mobility management entity
PDN packet data network
PDP packet data protocol
PLMN public land mobile network
P-GW packet gateway (PDN-GW)
S-GW serving gateway
UE user equipment
VSS visitor subscriber server Mobile communication operators, and fixed wireless/wired communication operators or Internet Service Providers (ISPs), typically offer wireless broadband connections with a capped maximum speed, e.g., with a flat-rate limit. At times there can be a capacity to offer higher data rates, and in some cases a user of a mobile device or mobile node may wish to temporarily exceed the user's subscribed flat-rate limit. This type of situation is often referred to as an offload scenario. For example, a small high capacity cell locally offers complementary access for a wide area network. As another example, a small local cell offers higher capacity with lower cost compared to a wide area larger cell.

Saunalahti (Saunalahti Group Oyj, Finland) has previously offered the following service in their fixed ADSL network: on the Saunalahti homepage there was presented a "turbo button". By pressing this button the user agreed to pay some additional fee (e.g. 2€) and the ASDL connection speed was increased for the next 24 hours from the normal subscription speed (e.g., 1 Mbit/s) to some higher speed, e.g., to a maximum speed (e.g., 8 Mbit/s).

SUMMARY

The foregoing and other problems are overcome, and other advantages are realized, by the use of the exemplary embodiments of this invention.

In a first aspect thereof the exemplary embodiments of this invention provide a method that comprises detecting in a wireless communication network an excess capacity condition and increasing from a currently subscribed-to value, to a higher value, an aggregated bit rate for a mobile node operating in the wireless communication network.

In another aspect thereof the exemplary embodiments of this invention provide an apparatus that comprises at least one data processor and at least one memory including computer program code. The at least one memory and computer program code are configured, with the at least one processor, to cause the apparatus at least to detect in a wireless communication network an excess capacity condition and to increase from a currently subscribed-to value, to a higher value, an aggregated bit rate for a mobile node operating in the wireless communication network.

In another aspect thereof the exemplary embodiments of this invention provide a method that comprises operating a mobile node in a wireless communication network in accordance with a currently subscribed-to value of an aggregated maximum bit rate. The method further comprises, in response to an occurrence of availability of additional capacity in the wireless communication network, sending information from the mobile node to the wireless communication network for requesting an increase from the currently subscribed-to value of the aggregated maximum bit rate to a higher value.

In a still further aspect thereof the exemplary embodiments of this invention provide an apparatus that comprises at least one data processor and at least one memory including computer program code. The at least one memory and computer program code are configured, with the at least one processor, to cause the apparatus at least to operate a mobile node in a wireless communication network in accordance with a currently subscribed-to value of an aggregated maximum bit rate. In response to an occurrence of availability of additional capacity in the wireless communication network, the apparatus is further configured to send information from the mobile node to the wireless communication network for requesting an increase from the currently subscribed-to value of the aggregated maximum bit rate to a higher value.

In another aspect thereof the exemplary embodiments of this invention provide an apparatus that comprises means for detecting in a wireless communication network an excess capacity condition, and means for increasing, from a currently subscribed-to value, to a higher value an aggregated bit rate for a mobile node operating in the wireless communication network.

In yet another aspect thereof the exemplary embodiments of this invention provide an apparatus that comprises means for operating a mobile node in a wireless communication network in accordance with a currently subscribed-to value of an aggregated maximum bit rate and means, responsive to an occurrence of availability of additional capacity in the wireless communication network, for sending information from the mobile node to the wireless communication network for requesting an increase from the currently subscribed-to value of the aggregated maximum bit rate to a higher value.

BRIEF DESCRIPTION OF THE DRAWINGS

In the attached Drawing Figures:

FIG. 6 shows a portion of a UE context in a PDN gateway with the addition of the novel AMBR definitions in accordance with the exemplary embodiments. Similar UE context definitions may appear in the MME, in the serving gateway (S-GW) and in the UE respectively. These definitions also appear in the HSS, and may appear in the VSS.

DETAILED DESCRIPTION

As used herein a wireless communication network can be considered to be, as non-limiting examples and without a loss of generality, any mobile broadband network, any mobile network with data transfer capabilities, any local area wireless network, any fixed wireless or wired broadband connection and any wireless connection between two or more devices.

Figure 1:
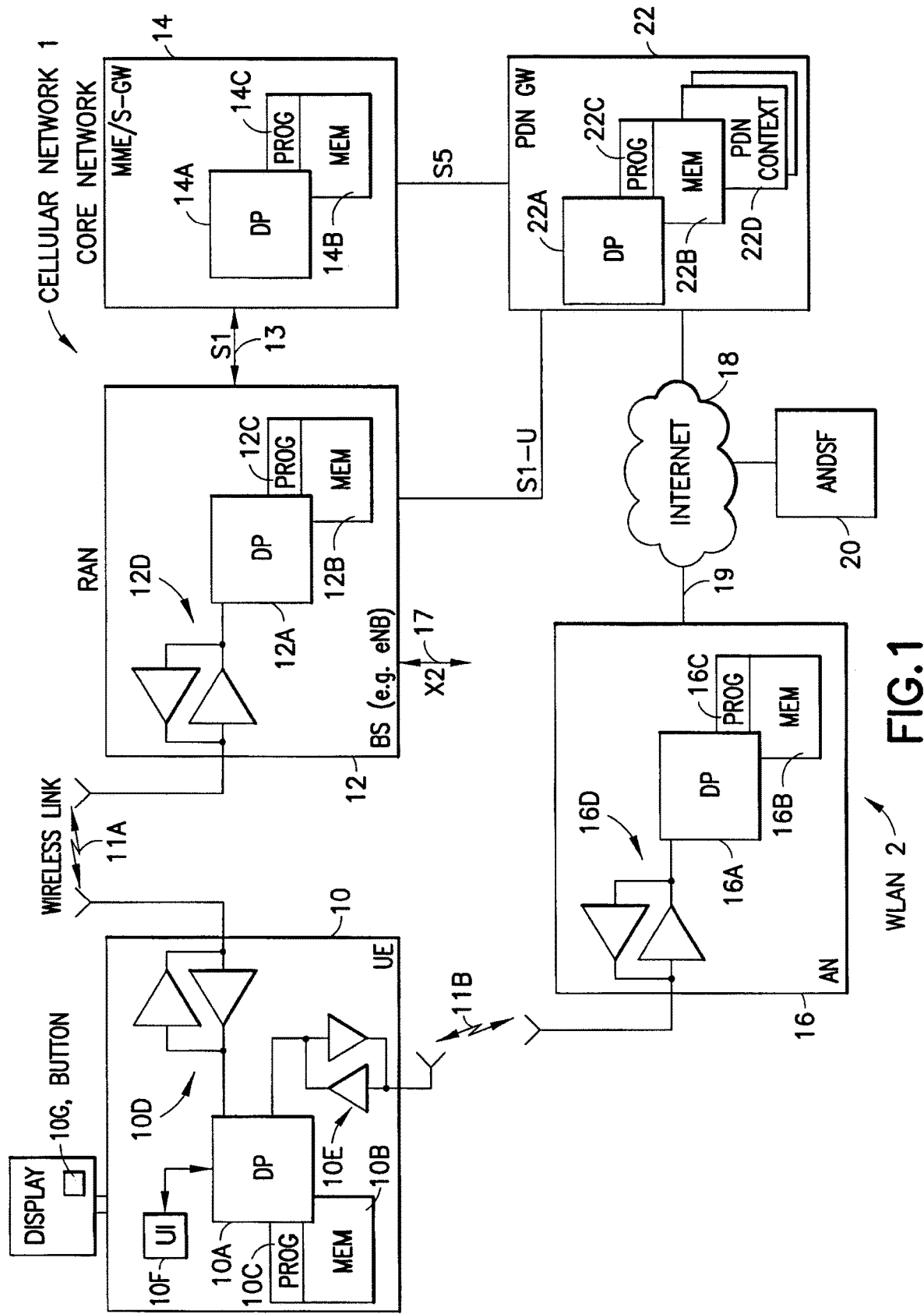
FIG. 1 shows a simplified block diagram of various electronic devices that are suitable for use in practicing the exemplary embodiments of this invention.
Figure 2A:
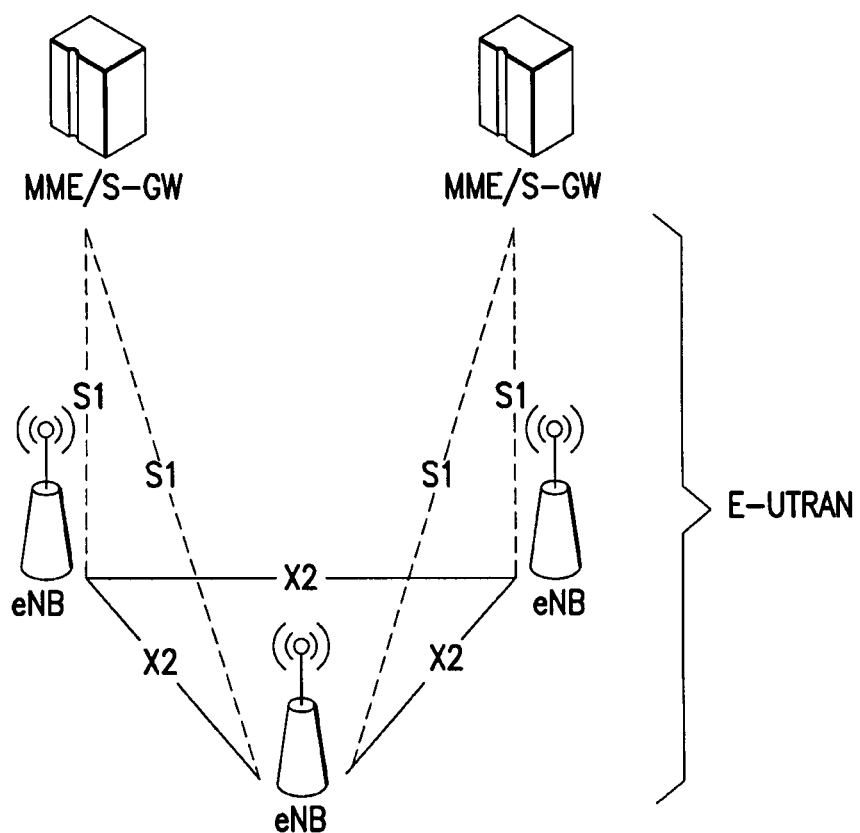
FIG. 2A reproduces FIG. 4.1 of 3GPP TS 36.300 and shows the overall architecture of the EUTRAN system, and illustrates an exemplary embodiment where the base station of FIG. 1 is embodied as an eNB in an LTE or an LTE-A type of wireless communication system.

FIG. 1 shows a simplified block diagram of various electronic devices and apparatus that are suitable for use in practicing the exemplary embodiments of this invention. In FIG. 1 a cellular wireless communication network 1 having a radio access network (RAN) is adapted for communication over a wireless link 11A with an apparatus, such as a mobile communication device which may be referred to as a UE 10, via a network access node, such as a base station (BS) 12. In one non-limiting embodiment the BS 12 can be embodied as an eNB if the cellular network 1 is a long term evolution (LTE) or an LTE-Advanced (LTE-A) E-UTRAN type of network. FIG. 2A shows the overall architecture of the E-UTRAN system. In another non-limiting embodiment the BS 12 can be embodied as a Node-B if the cellular network 1 is a general packet radio service (GPRS) type of network. The network 1 includes a core network that includes at least one serving gateway (S-GW) and can include at least one a mobility management entity (MME), here collectively shown as the MME/S-GW 14, and which together with the PDN gateway (PDN-GW) can provide connectivity with a further network, such as a telephone network and/or a data communications network (e.g., the Internet 18 or an Intranet). In the E-UTRAN network the core network can be referred to as an evolved packet core (EPC) or as an evolved packet system (EPS). Various servers can be reached through the Internet 18. These servers typically offer services and applications for the user of the device. In the network, either in the operator's core network or in the Internet, there may appear servers for a special purpose, e.g., for the purposes of device management of the operator's subscribed fleet. Other servers may exist for the purposes of guiding device connectivity, radio access selection policies or routing policies such as an access network discovery and selection function (ANDSF) 20. At least one packet data network gateway (PDN GW) 22 will be present in the core network, which provides UE's connectivity to a packet network such as the Internet 18.

Figure 2B:
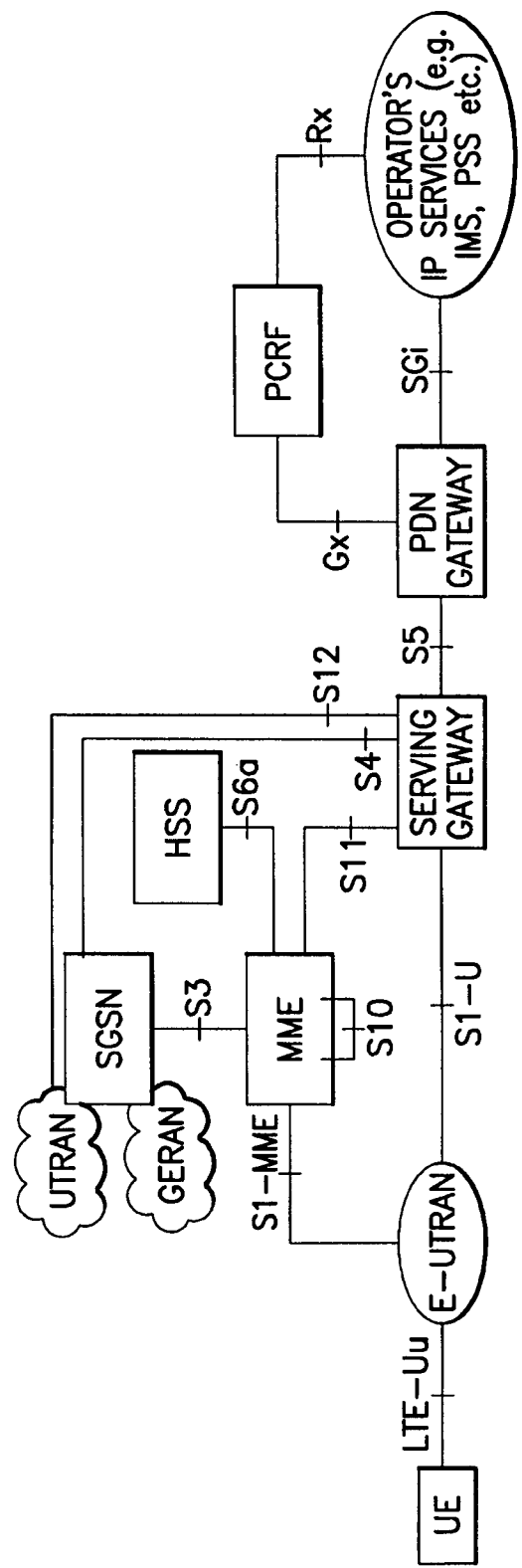
FIG. 2B reproduces FIG. 4.2.1-1 of 3GPP TS 23.401 and shows a PDN GW in the exemplary context of a non-roaming architecture for 3GPP accesses.
Figure 4:
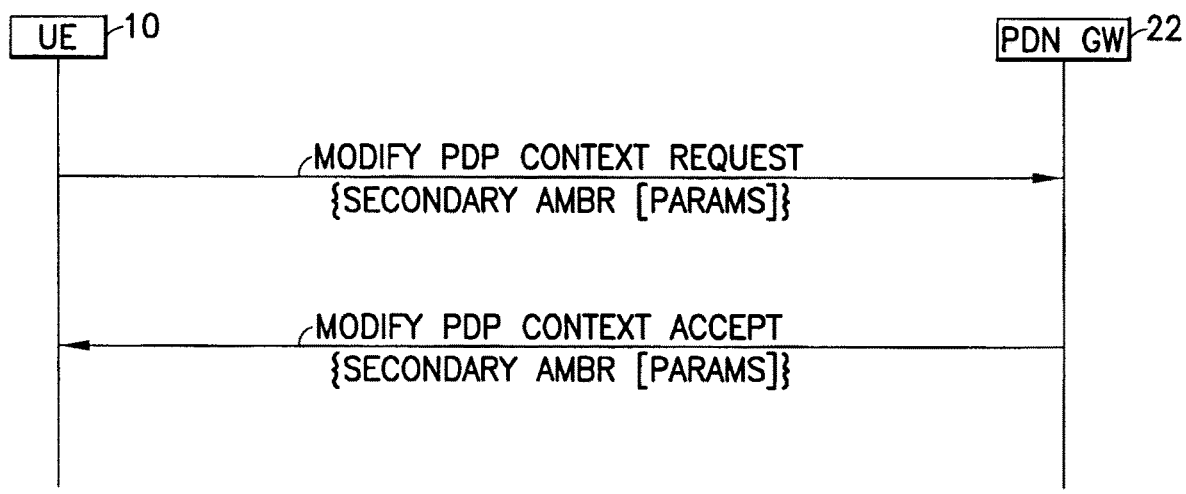
FIG. 4 shows a procedure for a Modify PDP context, which is requested of a PDN gateway by a UE and which can lead to modification of AMBR parameters.

FIG. 2B reproduces FIG. 4.2.1-1 of 3GPP TS 23.401 and shows a PDN GW in the exemplary context of a non-roaming architecture for 3GPP accesses. Note that in some embodiments the MME and S-GW can be co-located.

For the purposes of describing the embodiments of this invention there can also be assumed to be at least one type of wireless local area network (WLAN) 2, such as a WiFi network, having at least one access point or access node (AN) 16 for conducting communications with the UE 10 via a wireless link 11B. The AN 16 may be embodied as a WiFi hotspot or as a local (e.g., home) base station, as a pico base station or as a femto base station. The AN 16 has an interface 19 to the Internet 18. The interface 19 may be, for example, a high speed interface such as an Ethernet link. These kinds of accesses may provide additional opportunities for the connectivity of a device, in addition to the multiple radio access technologies available in multiple frequency layers and multiple cell hierarchies provided by a mobile network operator, a virtual network operator, or a visited (roamed) network operator.

The UE 10 includes a controller, such as at least one computer or a data processor (DP) 10A, at least one non-transitory computer-readable memory medium embodied as a memory (MEM) 10B that stores a program of computer instructions (PROG) 10C, at least one suitable radio frequency (RF) transmitter and receiver pair (transceiver) 10D for bidirectional wireless communications with the eNB 12 via one or more antennas, at least one suitable RF transmitter and receiver pair (transceiver) 10E for bidirectional wireless communications with the AN 16 via one or more antennas, and some type of user interface (UI) 10F, such as a touch sensitive display screen and/or a physical keypad or keyboard with a display screen. The eNB 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas (typically several when multiple input/multiple output (MIMO) operation is in use). The eNB 12 is coupled via a data/control path 13 to the MME/GW 14. The path 13 may be implemented as the S1 interface shown in FIG. 2. The eNB 12 may also be coupled to another eNB (not shown) via a data/control path 17, which may be implemented as the X2 interface shown in FIG. 2. The AN 16 also includes a controller, such as at least one computer or a data processor (DP) 16A, at least one computer-readable memory medium embodied as a memory (MEM) 16B that stores a program of computer instructions (PROG) 16C, and at least one suitable RF transceiver 16D for communication with the UE 10 via one or more antennas and the wireless link 11B. The PDN GW 22 will also includes a controller, such as at least one computer or a data processor 22A, at least one computer-readable memory medium embodied as a memory 22B that stores a program of computer instructions 22C. The memory 22B can also be assumed to store the UE's PDN contexts 22D, an example of which is shown in FIG. 6. Similarly, there can be assumed to be stored the UE's PDP contexts. FIG. 6 reproduces a portion of Table 5.7.4-1: that is the UE's context in the P-GW, found in section 5.7.4 of 3GPP TS 23.401, V10.0.0 (2010-06). The PDN context is modified to include information elements in accordance with the exemplary embodiments. The PDN GW 22 provides, as shown in FIG. 2B, connectivity with an operator's IP services and thus provides a path to the Internet 18. As was noted above, similar UE context definitions may appear in the MME, in the S-GW, and also in the HSS or VSS.

At least one of the programs 10C, 12C, 14C, 16C, 22C is assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by one of the data processors, or by hardware, or by a combination of software and hardware (and firmware).

In general, the various embodiments of the UE 10 can include, but are not limited to, cellular phones, smartphones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablet-based and notebook-based computing or communicator devices, as well as portable units or terminals that incorporate combinations of such functions.

The computer-readable memories 10B, 12B, 14B, 16B, 22B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 10A, 12A, 14A, 16A, 22A may be of any type suitable to the local technical environment, and may include one or more of general purpose computers, special purpose computers, microprocessors, digital signal processors (DSPs) and processors based on multi-core processor architectures, as non-limiting examples.

Exemplary publications that are descriptive of the various forms that the network 1 shown in FIG. 1 can assume include, but are not limited to: 3GPP TS 36.300, V8.11.0 (2009-12), 3rd Generation Partnership Project; Technical Specification Group Radio Access Network; Evolved Universal Terrestrial Radio Access (E-UTRA) and Evolved Universal Terrestrial Access Network (EUTRAN); Overall description; Stage 2 (Release 8); 3GPP TR 36.912 V9.3.0 (2010-06) Technical Report 3rd Generation Partnership Project; Technical Specification Group Radio Access Network; Feasibility study for Further Advancements for E-UTRA (LTE-Advanced) (Release 9); 3GPP TS 23.060 V10.0.0 (2010-06) Technical Specification 3rd Generation Partnership Project; Technical Specification Group Services and System Aspects; General Packet Radio Service (GPRS); Service description; Stage 2 (Release 10); and 3GPP TS 23.401 V10.0.0 (2010-06) Technical Specification 3rd Generation Partnership Project; Technical Specification Group Services and System Aspects; General Packet Radio Service (GPRS) enhancements for Evolved Universal Terrestrial Radio Access Network (E-UTRAN) access (Release 10).

Of particular interest herein is section 5.7, Information storage, of 3GPP TS 23.401 V10.0.0 (2010-06). For example, Table 5.7.2-1: MME MM and EPS bearer Contexts, of section 5.7.2, MME, describes (in part) two fields:

Subscribed APN-AMBR The Maximum Aggregated uplink and downlink MBR values to be shared across all Non-GBR bearers, which are established for this APN, according to the subscription of the user.

APN-AMBR The Maximum Aggregated uplink and downlink MBR values to be shared across all Non-GBR bearers, which are established for this APN, as decided by the PDN-GW.

Also of interest is Table 5.7.4-1: P-GW, found in section 5.7.4 of 3GPP TS 23.401, V10.0.0 (2010-06). A portion of this table is shown in FIG. 6, with modifications in accordance with the exemplary embodiments described below.

Also of interest herein is section 9.2, PDP Context Activation, Modification, Deactivation and Preservation functions, of 3GPP TS 23.060 V10.0.0 (2010-06), in particular section 9.2.2, Activation procedures, section 9.2.3, Modification procedures, and section 9.2.4, Deactivation procedures.

The exemplary embodiments of this invention inform a user of the UE 10 when and where, and by what type of connectivity (e.g., WiFi, femto or cellular), and at what cost, additional data transfer capacity can be made available, thereby enabling the user in exchange for a fee (or by agreeing to receive advertisements) to obtain the additional data transfer capability.

In addition, a service (such as Ovi™, Nokia Corporation) accessed by a user with connection capacity that is limited by a contract (e.g., monthly data package with a limited maximum speed), could be offered a higher speed (if available) at the initiative of the service.

As a non-limiting example of a scenario in which the embodiments of this invention can be useful, assume that a certain user has a limited data rate subscription but wishes to show a video to a friend without subscribing continuously to a better and notably more expensive connection. In this case the user can decide to temporarily exceed the data rate subscription limit and temporarily obtain a higher data rate at some additional cost. Alternatively, exceeding the data rate subscription limit may be offered free of charge, or free of charge but in exchange for the user agreeing to view advertisements that are included in the service. The service may include in general video, data, audio, streaming, media, gaming or any combination thereof. The advertisement may be any add on material to the actual service flow offered, or it may be a flow itself, say a trailer, an icon, a video clip, a sidebar, a preview picture, an attachment, a banner, or similar type of audio-visual media presentation.

To accomplish this type of operation on the UI 10F of the UE 10 a button 10G can be provided. The button 100 can be, for example, a dedicated physical push button, or a soft button associated with a software re-configurable push button, or a virtual button that occupies a portion of the touch sensitive display screen area. The button 10G can be labeled, e.g., "Higher Speed". When no additional network capacity is available this button 10G is de-emphasized (e.g., is displayed as grey), but then when capacity becomes available the button 10G is emphasized (e.g., displayed in a color such as green). By pressing the button 10G the user agrees to pay an additional fee and the wireless broadband connection speed is increased for some predefined time period (e.g., for the next 2 hours) from the normal subscription speed (e.g., one that uses only the normal cellular spectrum) to the higher, possibly maximum, speed (bit rate) that is (currently) available.

The exemplary embodiments thus provide for temporarily increasing the data transfer capability of the mobile device (UE 10), and in addition provide an indication (via button 10G) of the actual current availability of the increased data transfer capability depending on, for example, the current location of the UE 10 in the network 1 and the current time of day. Thus, the ability to achieve the higher data transfer speed can vary from location-to-location and from moment-to-moment at a given location.

As the availability of additional capacity is uncertain (e.g., other heavy data users appear or user may move to an area where additional capacity is not available), additional limitations may exist, e.g.: the higher speed offer is valid only at the current location of the UE 10. The offer may also be limited to be accepted only for some period of time, e.g., an hour, a day, a week, a month, or it may be exclusive of normal business hours and valid at other times (e.g., valid only during off-peak times of the day (or week).

Another alternative to a purely timer-based solution is that the charging is based on usage. For example, the charged amount is determined based on how much benefit the user has obtained from activating the button 10G as determined from a measurement of the traffic that is send through the secondary spectrum (to the AN 16).

Business and other users that wish to always maximize their data speed can make a permanent "subscription" for a higher data rate. In this case the operator knows that these users would by default press the button 10G to obtain the greater data transfer capacity when it is available (and when there is data to transmit). In this case the network can automatically give these users the higher data transfer rate when it becomes available, and thus react as if the user had pressed the button 10G as soon as it indicated that there was excess capacity in the network.

According to an exemplary embodiment of the invention, by activating the higher subscribed-to value online, the user when needing the higher speed for the first time may request a validity period that is infinite, active for the time being, or active for some mutually agreed period (modus vivendi). This subscription upgrade can then later be confirmed by a contract and can become the only (thereby upgraded) limit for the subscription thereafter.

In general, the increase in the data transfer speed for the UE 10 can be temporary in accordance with at least one of a temporal and a spatial constraint, or the increase can be permanent and can be achieved by modifying the currently subscribed-to value of the aggregated maximum bit rate (AMBR) to a new subscribed-to value for the UE 10.

The higher speed button 10G can be a physical pushbutton or preferably a software function that is coded as, for example, a radio (soft) button. This function may be available for direct user action or it may be present in a user's preferences or settings that allow the network 1 to automatically apply the data rate increase when feasible. The triggering of this function can thus be based on a) the user's immediate action, b) the user's preferred setting, or c) it may be conditioned on presence services. Such presence services can change the actions of the UE 10 automatically depending on the current presence of the user, e.g., if the user is at home, in the office, in a private car, in a public vehicle, in a city hotspot, at an airport, etc. For example, the user may always wish to default to the highest available data transfer rate when in the office but not otherwise. The current presence state of the user terminal (UE 10) can be assumed to be communicated to the network 1 in signaling. This signaling may be, for example, a UE initiated presence update or a presence update by a protocol executed between the UE 10 and the network based on, for example, UE 10 location or measurement reports.

The following discussion will explain in greater detail how the system becomes aware of the available capacity, how to inform suitable devices or services of the available capacity, how to inform the user of the opportunity of offloading capacity, how to allow the user or a service to trigger the opportunity to offload, and how to allow the network operator to make the appropriate changes to the traffic control functions (traffic shaping, traffic management) and to the charging.

According to the exemplary embodiments the increase in data transfer rate (data boosting) can be offered by the network 1 without user action other than enabling the offload of capacity. The network 1 can offer a temporary benefit for the user to fully exploit the user's device capability when the network settings so allow. For example, the network 1 can have advanced wireless cellular technology (e.g., high speed packet access (HSPA) and/or LTE) to offer 10 Mbps or higher throughput, and the UE 10 has the capability to support these higher data rates. However, the flat-rate agreement of the subscribed user may limit the user throughput to 2 Mbps (or 384 kbps) and, as a result, the user is not able to fully exploit the capabilities of the UE 10. The use of the exemplary embodiments allows the network 1 to temporarily relax the flat-rate limit and deviate from the set flat-rate limits. Alternatively, if exceeding the flat rate limit will incur a cost to the user, the network 1 can solicit the user for approval. In this case the charging mechanism is such that if the user experiences the deviation to the higher bitrates having a minor or no cost impact to him, the user experiences true gains of such boosting and the user can be confident that the measure of such an additional cost is technically properly calculated. These costs will then later appear properly in the communication bill of the subscriber.

One way to motivate this kind of operation, possibly with no or negligible cost impact to the user, can be to make an assumption that the higher data rate services are such that will cause the user to use services that the user would not normally use otherwise, or the higher data rates enable the user to better enjoy the offered quality of the service, or to enable the user to receive additional media components with the service that motivates the user. Another example is that an advertiser connected with the service absorbs the (increased) transport expenses for the sake of providing an enhanced experience for the user, making the advertisements more impressive and yet not letting the service suffer from the presence of (even heavy) advertisement flows. The advertisements, if well designed, can possibly enhance the service experience of the user.

It should be noted that carrier aggregation is one technique to provide excess capacity and to trigger the relaxation of subscribed-to bit-rate values or the activation of the secondary AMBR according to the invention.

For example, the network 1 may increase its offered capacity by carrier aggregation. In carrier aggregation, the radio access network, particularly the base station (eNB 12) or remote radio heads (RRH) connected to the base station, will set-up more carriers for transceiving. The carrier aggregation configuration is signaled from the network to the UE 10. This signaling will activate secondary cell measurements in the UE 10. Based on the measurement reports by the UE 10 the network may then activate and deactivate secondary cells (or secondary carriers, respectively). According to an embodiment of this invention, configuring or activating secondary cells for carrier aggregation can be interpreted as a trigger that excess capacity has become available in the network, and causes relaxation of the subscribed-to value, or an activation of the secondary AMBR. Similarly, removing secondary cells from the carrier aggregation configuration, or at least deactivating them, may trigger the removal of the previous relaxation of the subscribed-to value, and the actual subscribed-to value becomes the limiting bit transfer rate once again. Similarly this type of reconfiguration or secondary cell deactivation may trigger the secondary AMBR to become non-active, and causes a return to the primary AMBR value.

The selection for increasing the bit rate limit of the UE 10 connection to the network 1 or the UE 10 connection to a server may include one or more of the following.

Assume that the network 1 has determined to offload traffic to another access network. For example, the network 1 may determine to offload to another network (e.g., the WLAN 2 of FIG. 1) which can offer higher user throughput than the currently serving access network, or that exhibits a lower cost per bit which therefore allows consumption of higher user throughput. One reason for this is that a single user throughput does not become a capacity bottleneck for the other users to be served, because the network may consist of small cells having only a single or a few active users simultaneously, and the network has the high throughput interface 19 to the Internet 18, such as the Ethernet. The cost-per-bit advantage is realized in the network, meaning that the same amount of bits delivered in different parts of the network have different cost. Therefore, the capacity offering in large macro-cells with a large number of users, long transport distances and expensive transfer links to the backbone can be much more costly as compared to small cells, short distances and close connections to the local backbone network. Therefore, it is well motivated that the subscribed-to value is rather relaxed in the case when the cost-per-bit is low.

The selection may also be based on a decision by the network 1 to aggregate transmissions on the used spectrum to other, further portions of available spectrum. This other available spectrum may be, for example, a) the operator's locally licensed additional spectrum, b) locally available "white space" spectrum, which is made viable by licensing, by spectrum sharing or by regulatory rules, or c) unlicensed spectrum that locally is not crowded by interference so that it becomes usable by the operator. The above-described carrier aggregation embodiments can be considered as a variant of this selection approach.

The selection could also be similar to the one based on the network decision to offload, but instead it is the UE 10 that detects or discovers the presence of another network (e.g., the WLAN 2) that is available for offload. In this case, the UE may switch its traffic or some of its traffic flows to the offloading network. Or according to an alternative embodiment, the UE 10 can spontaneously arrange a secondary packet data network (PDN) connection via the discovered offload network, or the UE 10 can request the serving network 1 to arrange a secondary PDN connection via the discovered other access network. In this way, the UE may concurrently use the two network connections. The exact procedure used to divide the flows between these different access networks can take a number of forms. However, in general, this approach supports relaxation of the subscribed-to value, either in both the networks or separately in either one of the networks.

Information on available offload networks or additional capacity in the cellular network can be obtained by either the UE 10 (or several UEs) carrying out radio sensing, or the information can be obtained from the infrastructure of network 1. One embodiment of the detection of such an offload network is one that obtains assistance from the ANDSF server 20.

Reference can be made, for example, to Request for Comments (RFC) 6153, February 2011, S. Das and G. Bajko, "DHCPv4 and DHCPv6 Options for Access Network Discovery and Selection Function (ANDSF) Discovery". This RFC defines Dynamic Host Configuration Protocol (DHCPv4 and DHCPv6) options to enable a mobile node to discover ANDSF entities in an IP network. ANDSF is being developed in the 3GPP to provide inter-system mobility policies and access network-specific information to mobile nodes. ANDSF also supports selected Open Mobile Alliance (OMA) device management object functions.

In general the offload decision for the network 1 can be based on some (historical) low data rate usage (for some particular location and/or time of day) over a sufficiently long period of time, such as a time parameter expressed as T_threshold. Another methodology can measure the actual use of capacity or predict the future status of the used capacity, and thus can predict the future potential for excess capacity conditions. This can be achieved by using a model, such as a Markov model, in conjunction with machine learning. Other prediction models and mechanisms exist in the literature.

The network 1 infrastructure has knowledge of the serving status of the connected devices (UEs 10). If the available capacity exceeds the capacity that the connected devices are served with the connected devices can be informed and thus their respective "Higher Speed" button 10G can be highlighted or otherwise alert the users of the opportunity to make themselves available of the excess capacity.

If a particular user selects to use the "Higher Speed" option, additional parameters for aggregated maximum bit rate (AMBR) information in, for example, the MME 14 is updated to reflect the new value to be used and the time validity of this information (see FIG. 6 described below). The information in the MME 14 is updated to necessary locations such as a PDN gateway 22 (see FIGS. 3, 4 and 5) and the UE 10.

In an alternative embodiment of the invention the MME 14 has in its subscriber information an allowance flag for a particular UE 10 to exceed the AMBR by requesting this from the PDN gateway 22. The allowance flag can be separate per access point name (APN) and/or per PDN connection. Additionally, a flag can be provided separately for a local IP access (LIPA) allowed case. Local IP access means in this context that a UE 10, in certain deployments, and in certain locations, is able to make a network connection via the local access node and its local gateway (a so-called breakout gateway) without using the actual PDN gateway for the offload traffic. The local gateway, in this case, may be configured to include the UE context information, similar as that present in the PDN gateway 22. The UE 10 may alternatively execute a procedure with the network to transfer (copy) part of the UE's context in the PDN gateway 22 to the local gateway. It is also within the scope of the exemplary embodiments of this invention to execute a local connection setup procedure to setup the local context into the local gateway separately from the PDN gateway 22. According to these exemplary embodiments of the invention, the relaxation of the subscribed-to value, or the use of the secondary AMBR, can take place when LIPA is in use, or at least for those flow(s) that use LIPA.

After the MME 14 has allowed the UE 10 to exceed the AMBR, the UE 10 can request the increase directly from the PDN gateway 22 by a PDP context update procedure and the UE 10 then receives in response the granted increased AMBR from the PDN gateway 22.

In general, it should be appreciated that increasing the data transfer speed of the UE 10, whether temporarily or permanently, can be based on a request initiated by user input via the button 10G, or by some other user interface means, or it can be based on a request that is autonomously generated by the UE 10 based on one or more trigger conditions being fulfilled.

Figure 3:
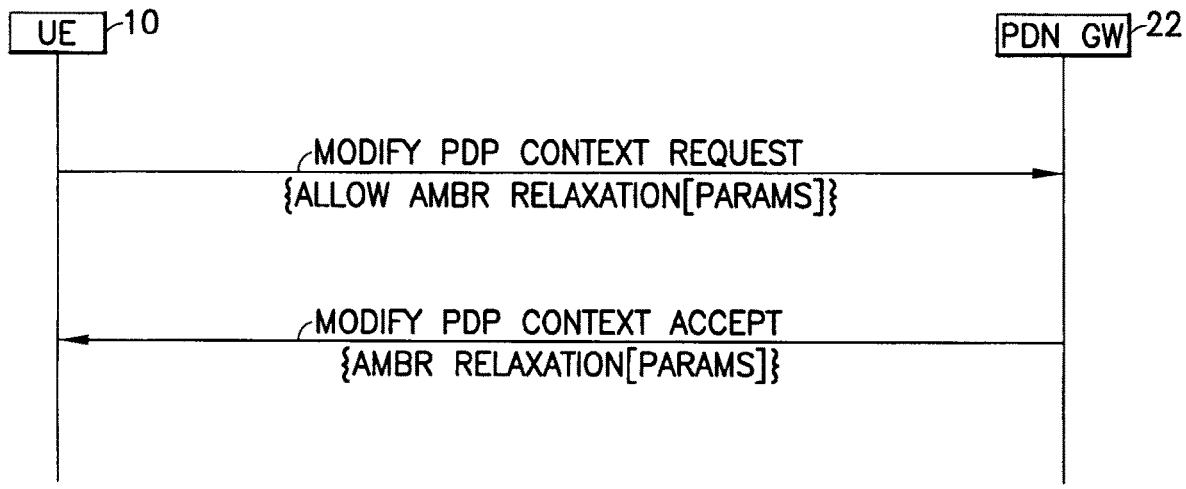
FIG. 3 shows a procedure for an exemplary Modify PDP context which is requested of a PDN gateway by the UE and which can result in the relaxation of the AMBR for conditions defined in the parameters of the Modify PDP context request.

FIG. 3 shows an exemplary a Modify PDP context procedure which is requested by the UE 10 and which can result in the relaxation of the AMBR for those conditions (e.g., validity time) defined in the parameters of the Modify PDP context request.

In the cases presented above the evolved packet system (EPS) bearer parameter AMBR is relaxed and resultant traffic shaping and management (which can be considered to include, for example, traffic management, scheduling, buffering, smoothing, bearer management) are not based on the subscribed-to AMBR value(s). Instead the UE 10, the eNB 12 and the related network elements manage the UE 10 (data) traffic based on the granted relaxation parameters. Traffic can in this context, for example, mean flows of IP traffic.

In accordance with a further embodiment to define AMBR exceptions, a definition of a secondary AMBR is made to the subscribed context information. The primary AMBR can be as currently defined, and the secondary AMBR is a parameterized AMBR that can be activated and put into use in response to a request from the UE 10. In this case the traffic shaping functions and bearer management functions apply the secondary AMBR values as opposed to, or as a substitute for, the primary AMBR values.

FIG. 4 shows a procedure for a Modify PDP context, which is requested by the UE 10, and which can lead to the modification of the AMBR parameters according to this embodiment of the invention.

Preferably the two foregoing AMBR exceptions (temporary relaxation as in FIG. 3 and applying the secondary AMBR as in FIG. 4) can be applied without EPS bearer reconfiguration. The EPS bearer reconfiguration is likely avoidable as the AMBR value is basically a limit constraining the sum of all aggregated bearers, which is handled by traffic shaping and not by bearer reconfiguration control per se. In general, however, the exemplary embodiments of this invention may be used with or without the execution of a bearer reconfiguration procedure.

Figure 5:
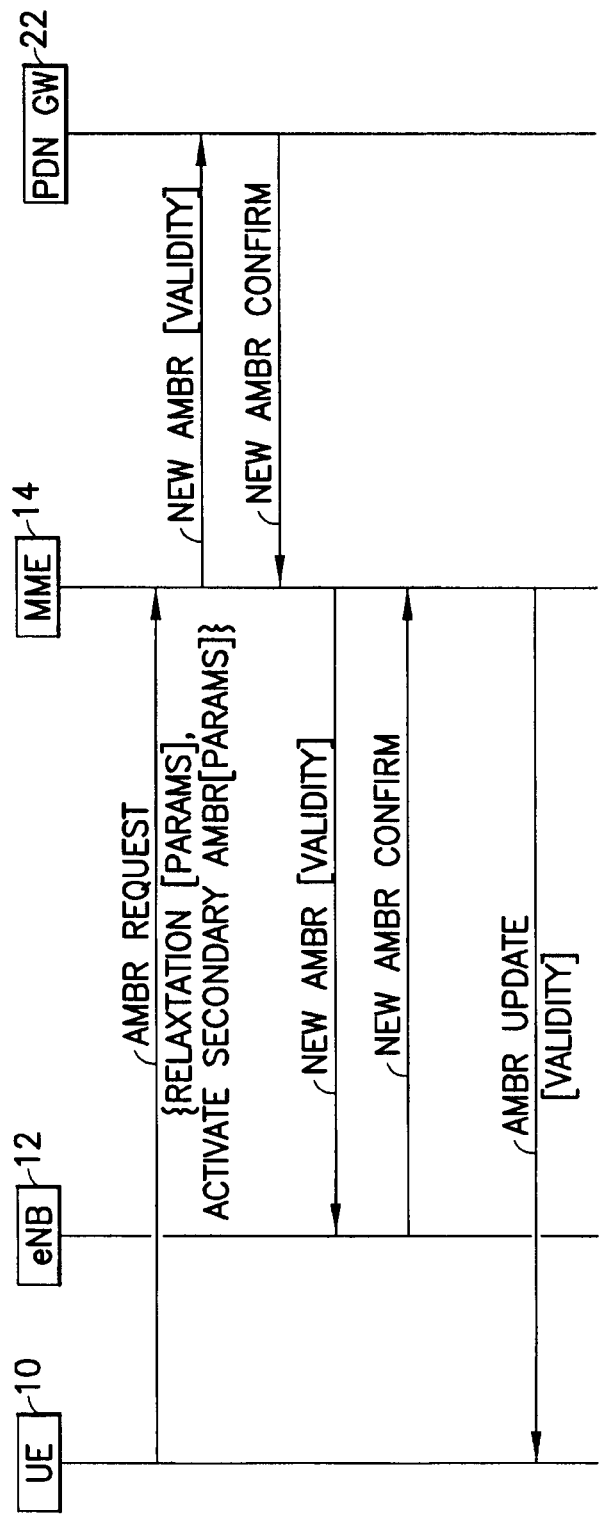
FIG. 5 shows a procedure for AMBR relaxation or for a secondary AMBR activation respectively with the involvement of the UE and the MME.

FIG. 5 shows a procedure for accomplishing the AMBR relaxation or the activation of the secondary AMBR via the MME 14. This procedure is an alternative to the PDP context modification procedures shown in FIGS. 3 and 4. In this technique the UE 10 makes an AMBR request (AMBR relaxation or the activation of the secondary AMBR) to the MME 14 via the eNB 12. The MME 14 sends the new AMBR to PDN GW 22 for confirmation of the validity of the AMBR request, and in response to the PDN GW 22 confirming the validity of the request the MME 14 then confirms the validity of the AMBR with the serving eNB 12. In response to receiving the new AMBR confirmation from the eNB 12 the MME 14 sends the (new) AMBR update to the UE 10 via the serving eNB 12. The validity checks and confirmations ensure that both the PDN GW 22 and the eNB 12 can accommodate the requested increase in the bit rate.

It should be noted again with respect to at least FIGS. 3 and 4 that increasing the aggregated bit rate from the subscribed-to value can be performed in response to receiving from the UE 10 a request at a gateway of the wireless communication network, where the request is one of to increase the aggregated bit rate from the currently subscribed-to value or to apply a secondary aggregated higher bit rate. In this case the request can be handled by the packet data network gateway alone, or the request can be handled by the packet data network gateway in cooperation with a serving gateway, or the request can be handled by the serving gateway alone, as three non-limiting examples.

With respect now to charging, in conventional practice charging is defined per PDN connection. The charging mechanisms include, e.g., normal, prepaid, flat-rate and/or hot billing. As the definition is per PDN connection, the charging principles may differ for different PDN connections. If the charging principle is common to several PDN connections still the costs or cost thresholds (e.g., regarding flat rate) may differ per PDN connection. A Charging Identifier (Charging Id) is used for identifying the charging records generated by the PDN gateway 22 for the home network and by a serving gateway for the visited network. The charging records are created for each EPS bearer within the PDN connection.

In conventional practice the access point name aggregated maximum bit rate (APN-AMBR) defines the aggregated uplink and downlink maximum bit rates to be shared across all non-guaranteed bit rate bearers that are established for the UE 10 in that APN. Hence, the AMBR limit can be set differently per APN. An example of an APN is, e.g., Elisa Internet, where the Internet connection does not depend on the actual radio access technology in use at the time but instead it defines the operator identifier (for example PLMN identity) and the network identifier for making the access to the Internet.

According to the exemplary embodiments of this invention, charging can be accomplished per APN or per PDN connectivity, as is presently known, but in addition can be based on the connection time used, or per advertisements received, or it can be free of charge. These various complementary charging mechanisms could be particularly useful for a PDN connection (or APN) that is only occasionally established in certain local spots that are used for offloading in order to increase the actual wide area heterogeneous network connections.

A non-limiting example of a UE 10 context in the PDN gateway 22D is shown in FIG. 6 with the AMBR parameter and charging mechanisms. As was note above, similar UE context definitions may appear in the MME, in the serving gateway and in the UE respectively. These definitions also appear in the HSS, and may appear in the VSS. In accordance with the exemplary embodiments newly added data elements of the PDN context include at least one of: AMBR exception allowed [ON/OFF], AMBR relaxation [validity] and/or Secondary AMBR [parameters]. The exemplary embodiments thus provide novel definitions of whether the AMBR relaxation is allowed, the AMBR relaxation with validity definitions, or definitions of the secondary AMBR.

As was noted above, the initiative as to whether to initiate the offload process can be taken by a service as opposed to by the UE 10. At least the initiation of the procedure may come from the UE 10 or from the service respectively.

In the exemplary embodiments of this invention there can be a detection of the excess capacity condition, and the increase of the aggregated bit rate to the higher value is performed in response to a request received from the UE 10. In this manner the network 1, after detecting the excess capacity condition, can offer the excess capacity to the UE 10 in some way, such as by activating a secondary cell using a carrier aggregation technique. In response the UE 10 would then request increasing its subscribed-to bit rate to a higher value, and this can occur without informing the user of the UE 10 at that moment. This approach is viable because it can be assumed that the user has already given permission in some way to obtain the increased bit rate if it becomes available. In fact, the user may not become aware of having used higher bit rates than the subscribed-to value until the user receives his bill for the communication services. The use of the higher bit rate does not need to have a negative impact on the subscriber's bill. For example, it may be presented as an advertisement-like notification that the subscriber actually experienced higher data transfer rates than his subscription would normally allow. If this occurs frequently the subscriber may be motivated to subscribe permanently to a higher data transfer rate. This clearly can add value both to the user and to the operator.

Further, and as was noted above, it should be appreciated that the exemplary embodiments of this invention can be implemented and used without executing a bearer reconfiguration procedure, or they can be implemented and used in conjunction with the execution of a bearer reconfiguration procedure.

It should be appreciated that the use of the exemplary embodiments of this invention provides a number of advantages and technical effects. For example, the use of the exemplary embodiments provides the possibility for users to obtain faster response, faster interaction, faster information transfer and possibly higher quality of the service (e.g., resolution of the service can be enhanced, such as by the use of layered codecs) or the service can be provided with additional media components. The user may also activate more services without experiencing their mutual quality degradations. The use of the exemplary embodiments also provides the possibility for services to offer an enhanced user experience. The use of the exemplary embodiments also provides the possibility for operators to differentiate the charging of capacity as the cost-per-bit and capacity offerings can differ between users. The use of the exemplary embodiments also provides a simple and intuitive user interface to initiate the offloading. In addition, network operators can have diversified charging models and can reduce costs by using less expensive local data delivery mechanisms. The users can also benefit in locations where additional capacity would be of high value for a specific use case. One example is using capacity in a media shop or media development facility.

Another user interface, according to the exemplary embodiments of this invention, can appear in the network operator's management center, where the subscription values and their limitations are configured. The new definitions for subscribed-to value exceptions, relaxations or secondary AMBR values and their validity parameters can be established, modified and viewed there.

Based on the foregoing it should be apparent that the exemplary embodiments of this invention provide a method, apparatus and computer program(s) to provide enhanced offload capacity for a telecommunications network and system.

Figure 7:
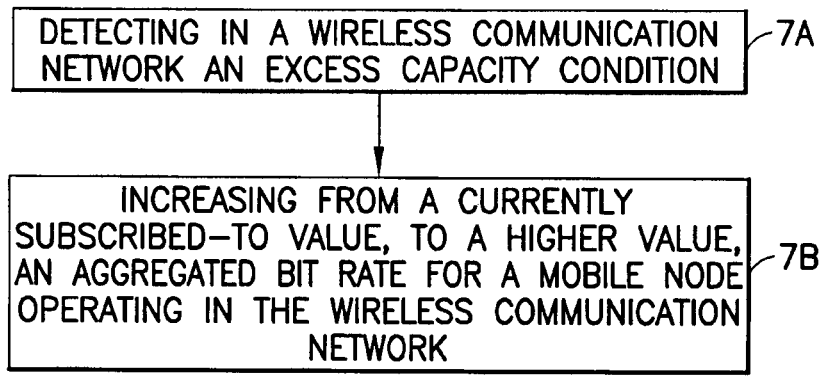
FIG. 7 is a logic flow diagram that illustrates the operation of a method, and a result of execution of computer program instructions embodied on a computer readable medium, in accordance with the exemplary embodiments of this invention.

FIG. 7 is a logic flow diagram that illustrates the operation of a method, and a result of execution of computer program instructions, in accordance with the exemplary embodiments of this invention. In accordance with these exemplary embodiments a method performs, at Block 7A, a step of detecting in a wireless communication network an excess capacity condition. At Block 7B there is a step of increasing, from a currently subscribed-to value, to a higher value an aggregated bit rate for a mobile node operating in the wireless communication network.

In the method depicted in FIG. 7 the step of detecting comprises informing a user of the mobile node of the detected excess capacity condition, and where increasing is performed in response to a request received from the user of the mobile node.

In the method depicted in FIG. 7 the step of increasing is performed in response to a request received from the mobile node.

In the method depicted in FIG. 7 the step of increasing is performed automatically in response to a predetermined subscription of the mobile node.

In the method depicted in FIG. 7 the step of increasing is performed automatically in response to a current presence state of the mobile node.

In the method depicted in FIG. 7 the excess capacity condition is detected in the wireless communication network.

In the method depicted in FIG. 7 the excess capacity condition is detected by detecting an existence of a wireless communication network for offload.

In the method depicted in FIG. 7 and described in the preceding paragraph, where the existence of the wireless communication network for offload is detected by the mobile node, and further comprising receiving in the wireless communication network from the mobile node an indication of the existence of the wireless communication network for offload.

In the method depicted in FIG. 7 the step of increasing is performed in response to one of receiving a request at a network gateway or at a network mobility management entity.

In the method depicted in FIG. 7 the step of increasing is performed in response to receiving from the mobile node a modify packet data protocol context request at a packet data network gateway, where the modify packet data protocol context request is one of to increase the aggregated bit rate from the currently subscribed-to value or to apply a secondary aggregated higher bit rate.

In the method depicted in FIG. 7 the step of increasing is performed in response to receiving from the mobile node a request at a mobility management entity of the wireless communication network, where the request is one of to increase the aggregated bit rate from the currently subscribed-to value or to apply a secondary aggregated higher bit rate, and where the request is handled by the mobility management entity in cooperation with at least a packet data network gateway.

In the method depicted in FIG. 7 the step of increasing is performed in response to receiving from the mobile node a request at a gateway of the wireless communication network, where the request is one of to increase the aggregated bit rate from the currently subscribed-to value or to apply a secondary aggregated higher bit rate, and where the request is handled by a packet data network gateway.

In the method depicted in FIG. 7, and further comprising charging the mobile node for a connection that uses the increased aggregated bit rate based on at least one of the connection time and a presence of advertisements delivered to the mobile node through the connection.

In the method depicted in FIG. 7 the increase is temporary in accordance with at least one of a temporal and a spatial constraint.

In the method depicted in FIG. 7 the increase is permanent and is achieved by modifying the currently subscribed-to value of an aggregated maximum bit rate to a new subscribed-to value.

In the method depicted in FIG. 7 the step of increasing comprises using another wireless communication network for offload in place of or in combination with a currently used wireless communication network.

In the method depicted in FIG. 7 the step of increasing comprises using carrier aggregation to increase data transfer capacity of the wireless communication network.

In the method depicted in FIG. 7 the step of detecting is accomplished by the mobile node in response to the wireless communication network configuring at least one secondary cell.

In the method depicted in FIG. 7 the presence of the excess capacity condition is determined by the wireless communication network based on at least one of an actual amount of current capacity and a predicted amount of future capacity.

The exemplary embodiments also encompass a non-transitory computer-readable medium that contains software program instructions, where execution of the software program instructions by at least one data processor results in performance of operations that comprise execution of the method depicted in FIG. 7 and any one of the preceding paragraphs descriptive of FIG. 7.

Figure 8:
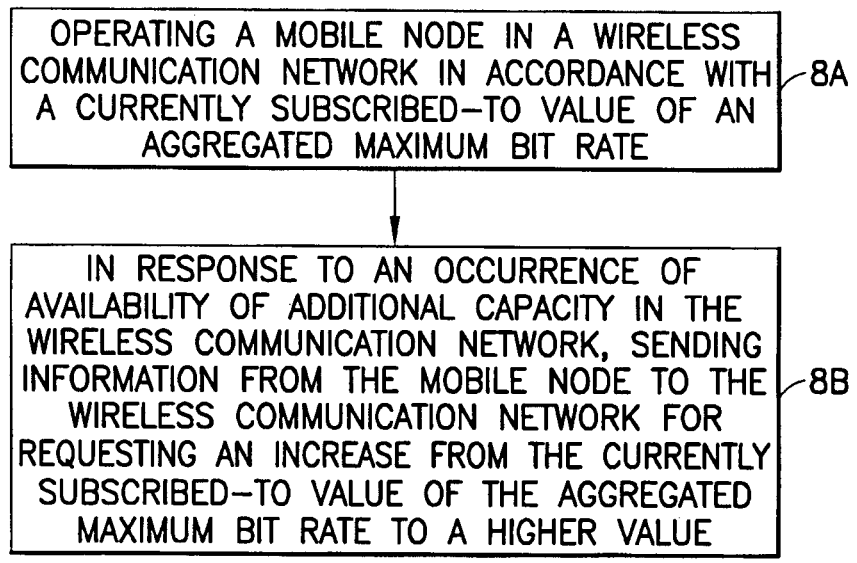
FIG. 8 is a logic flow diagram that illustrates the operation of a method, and a result of execution of computer program instructions embodied on a computer readable medium, further in accordance with the exemplary embodiments of this invention.

FIG. 8 is a logic flow diagram that illustrates the operation of a method, and a result of execution of computer program instructions embodied on a computer readable medium, further in accordance with the exemplary embodiments of this invention. In accordance with these exemplary embodiments a method performs, at Block 8A, a step of operating a mobile node in a wireless communication network in accordance with a currently subscribed-to value of an aggregated maximum bit rate. At Block 8B there is a step performed, in response to an occurrence of availability of additional capacity in the wireless communication network, of sending information from the mobile node to the wireless communication network for requesting an increase from the currently subscribed-to value of the aggregated maximum bit rate to a higher value.

In the method depicted in FIG. 8 the step of operating the mobile node comprises receiving an indication of the occurrence of the availability of the additional capacity from the wireless communication network, and further comprising informing a user of the receipt of the indication and receiving an input from the user, and where the information that is sent comprises an indication of receipt of the user input.

In the method depicted in FIG. 8, and described in the preceding paragraph, the steps of informing the user and receiving the input from the user are performed via a user interface of the mobile node.

In the method depicted in FIG. 8, and described in the preceding paragraph, the step of informing is performed by emphasizing a displayed button, and where the input from the user is received in response to the user activating the displayed button.

In the method depicted in FIG. 8 where the occurrence of the availability of the additional capacity in the wireless communication network is detected by the mobile node and is communicated to the wireless communication network.

In the method depicted in FIG. 8, and described in the preceding paragraph, where the mobile node communicates an indication of the existence of the detection by the mobile node of a wireless communication network for offload.

In the method depicted in FIG. 8 where the step of sending sends a modify packet data protocol context request to the wireless communication network, where the modify packet data protocol context request is one of to increase the aggregated bit rate from the currently subscribed-to value or to apply a secondary aggregated higher bit rate.

In the method depicted in FIG. 8 where the increase is temporary in accordance with at least one of a temporal and a spatial constraint.

In the method depicted in FIG. 8 where the increase is permanent and is achieved by modifying the currently subscribed-to value of an aggregated maximum bit rate to a new subscribed-to value.

In the method depicted in FIG. 8, where in response to being granted the increase the mobile node uses another wireless communication network for offload in place of or in combination with a currently used wireless communication network.

In the method depicted in FIG. 8, where the occurrence of the availability of the additional capacity in the wireless communication network is detected by the mobile node in response to the wireless communication network configuring carrier aggregation.

In the method depicted in FIG. 8, where the occurrence of the availability of the additional capacity in the wireless communication network is detected by the mobile node in response to the wireless communication network configuring at least one secondary cell.

The exemplary embodiments also encompass a non-transitory computer-readable medium that contains software program instructions, where execution of the software program instructions by at least one data processor results in performance of operations that comprise execution of the method depicted in FIG. 8 and any one of the preceding paragraphs descriptive of FIG. 8.

The various blocks shown in FIGS. 7 and 8 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Thus, it should also be appreciated that the exemplary embodiments of this invention also pertain to an apparatus that comprises at least one data processor and at least one memory including computer program code. The at least one memory and computer program code are configured, with the at least one processor, to cause the apparatus at least to respond to a detection in a wireless communication network of an excess capacity condition and to increase, from a currently subscribed-to value, to a higher value an aggregated bit rate for a mobile node operating in the wireless communication network.

The exemplary embodiments of this invention also pertain to an apparatus that comprises at least one data processor and at least one memory including computer program code. The at least one memory and computer program code are configured, with the at least one processor, to cause the apparatus at least to operate a mobile node in a wireless communication network in accordance with a currently subscribed-to value of an aggregated maximum bit rate. The apparatus is further configured, in response to an occurrence of availability of additional capacity in the wireless communication network, to send information from the mobile node to the wireless communication network for requesting an increase from the currently subscribed-to value of the aggregated maximum bit rate to a higher value.

The exemplary embodiments of this invention also pertain to an apparatus that comprises means for detecting in a wireless communication network an excess capacity condition and means for increasing, from a currently subscribed-to value, to a higher value an aggregated bit rate for a mobile node operating in the wireless communication network.

The exemplary embodiments of this invention further encompass an apparatus that comprises means for operating a mobile node in a wireless communication network in accordance with a currently subscribed-to value of an aggregated maximum bit rate and means, responsive to an occurrence of availability of additional capacity in the wireless communication network, for sending information from the mobile node to the wireless communication network for requesting an increase from the currently subscribed-to value of the aggregated maximum bit rate to a higher value.

These various means include at least the elements shown in FIG. 1, including the data processors, memories, program code, transceivers and interfaces.

It should be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN and LTE-A types of systems, it should be appreciated that the exemplary embodiments of this invention are not limited for use with any one particular type of system and network, and that they may be used to advantage in other types of wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., AMBR, etc.) are not intended to be limiting in any respect, as these parameters may be identified by any suitable names. Further, the various names assigned to different network elements and entities (e.g. ANDSF, MME, PDN GW, etc.) are not intended to be limiting in any respect, as these various network elements and entities may be identified by any suitable names, as may the interfaces that exist between these network elements and entities.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:

detecting, by a network device in a wireless communication network that an excess data transfer capacity is made available to a mobile node operating in the wireless communication network in response to a need of offloading of data transfer capacity to the mobile node operating in the wireless communication network, where the determining is based on at least a cost per bit advantage realized by the allocating;

in response to the determining, triggering, by the network device, the offloading of the data transfer capacity to a second wireless communication network to allocate the available excess data transfer capacity in the wireless communication network; and based on the triggering the offloading of the data transfer capacity activating the second wireless communication network and increasing an aggregated maximum bit rate that is according to a subscription for the mobile node with an operator of the wireless communication network to exceed a currently subscribed to aggregated maximum bit rate bearer for the aggregated maximum bit rate allowing use of the available excess data transfer capacity across all non-guaranteed bit rate bearers, where the increasing comprises using carrier aggregation to activate the second wireless communication network using the available excess data transfer capacity to increase data transfer capacity of the wireless communication network, where the increasing the aggregated maximum bit rate to exceed the currently subscribed to aggregated maximum bit rate bearer at the mobile node is performed without a bearer context modification;

where detecting comprises informing a user of the mobile node of the detected excess data transfer capacity,
where increasing is performed in response to a request received from the user of the mobile node, and
where the request is received from the mobile node via one of a dedicated physical button and soft push button on the mobile node.

2. The method of claim 1, where the informing comprises an offer from the wireless communication network to increase the currently subscribed to aggregated maximum bit rate bearer of the aggregated maximum bit rate to the mobile node.

3. The method of claim 2, where the offer is limited to be accepted by the mobile node for a period of time, comprising at least one of an hour, day, month, and exclusive of set business hours.

4. The method of claim 1, where a presence of the excess data transfer capacity is determined by the wireless communication network based on at least one of an actual amount of current capacity and a predicted amount of future capacity.

5. The method of claim 1, where the cost per bit advantage is determined based on at least one of a number of transfer links and a distance required for the allocated excess data transfer capacity to the mobile node.

6. An apparatus, comprising:
at least one data processor; and
at least one memory including computer program code, where the at least one memory and computer program code are configured, with the at least one processor, to cause the apparatus at least to:
detect in a wireless communication network that excess data transfer capacity is available to a mobile node in the wireless communication network in response to a need of offloading of data transfer capacity to a second wireless communication network;
determine to allocate the available excess data transfer capacity to the mobile node operating in the wireless communication network, where the determining is based on at least a cost per bit advantage realized by the allocating;
in response to the determining, trigger the offloading of the data transfer capacity to the second wireless network to allocate the available excess data transfer capacity in the wireless communication network; and
use the offloaded data transfer capacity and activate the second wireless communication network to increase an aggregated maximum bit rate according to a subscription for the mobile node with an operator of the wireless communication network to a higher exceed a currently subscribed to aggregated maximum bit rate bearer for the aggregated maximum bit rate allowing use of the available excess data transfer capacity across all non-guaranteed bit rate bearers,
where increasing comprises using carrier aggregation to activate the second wireless communication network using the available excess data transfer capacity to increase data transfer capacity of the wireless communication network,
where the increasing the aggregated maximum bit rate to exceed the currently subscribed to aggregated maximum bit rate bearer at the mobile node is performed without a bearer context modification,
where detecting comprises informing a user of the mobile node of the detected excess data transfer capacity,
where increasing is performed in response to a request received from the user of the mobile node, and
where the request is received from the mobile node via one of a dedicated physical button and soft push button on the mobile node.

7. The apparatus of claim 6, where the at least one data processor informs a user of the mobile node of the detected excess data transfer capacity condition.

8. The apparatus of claim 7, where the informing comprises an offer from the wireless communication network to increase the currently subscribed to aggregated maximum bit rate to the mobile node.

9. The apparatus of claim 8, where the offer is limited to be accepted by the mobile node for a period of time, comprising at least one of an hour, day, month, and exclusive of set business hours.

10. The apparatus of claim 6, where a presence of the excess data transfer capacity condition is determined by the at least one data processor of the apparatus based on at least one of an actual amount of current capacity and a predicted amount of future capacity.

11. A non-transitory computer-readable storage medium including code which when executed by at least one processor to cause an apparatus to perform operations comprising:
detecting in a wireless communication network that excess data transfer capacity is available to a mobile node in the wireless communication network in response to a data transfer capacity increase due to a need of offloading to a second wireless communication network;
determining to allocate the available excess data transfer capacity to the mobile node operating in the wireless communication network, where the determining is based on at least a cost per bit advantage realized by the allocating;
in response to the determining, triggering the offloading to allocate the available excess data transfer capacity to the second wireless communication network; and
using the offloaded data transfer capacity and activating the second wireless communication network to increase an aggregated maximum bit rate according to a subscription for the mobile node with an operator of the wireless communication network to exceed a currently subscribed to aggregated maximum bit rate bearer for the aggregated maximum bit rate bearer allowing use of the available excess data transfer capacity across all non-guaranteed bit rate bearers,
where increasing comprises using carrier aggregation to activate the second wireless communication network using the available excess data transfer capacity to increase data transfer capacity of the wireless communication network, and
where the increasing the aggregated maximum bit rate to exceed the currently subscribed to aggregated maximum bit rate bearer at the mobile node is performed without a bearer context modification,
where detecting comprises informing a user of the mobile node of the detected excess data transfer capacity,
where increasing is performed in response to a request received from the user of the mobile node, and
where the request is received from the mobile node via one of a dedicated physical button and soft push button on the mobile node.

12. The computer-readable storage medium of claim 11, where detecting comprises informing a user of the mobile node of the detected excess data transfer capacity condition.

13. The computer-readable storage medium of claim 12, where the informing comprises an offer from the wireless communication network to increase the currently subscribed to aggregated maximum bit rate to the mobile node.

14. The computer-readable storage medium of claim 13, where the offer is limited to be accepted by the mobile node for a period of time, comprising at least one of an hour, day, month, and exclusive of set business hours.

* * * * *